Feb. 9, 1932. A. VIGNE 1,843,963
TROLLEY
Filed June 29, 1931

Inventor
Albert Vigne
By E. E. Huffman
Att'y.

Patented Feb. 9, 1932

1,843,963

UNITED STATES PATENT OFFICE

ALBERT VIGNE, OF WEBSTER GROVES, MISSOURI, ASSIGNOR TO NATIONAL BEARING METALS CORPORATION, OF ST. LOUIS, MISSOURI, A CORPORATION OF NEW YORK

TROLLEY

Application filed June 29, 1931. Serial No. 547,605.

My invention relates to a trolley construction and particularly to means for lubricating the trolley wheel to prevent excessive wear between either the bore of the wheel and the non-rotary axle, upon which it is mounted, or between the ends of the wheel hub and the conducting springs used to carry the trolley current from the wheel to the trolley harp.

Figure 1:
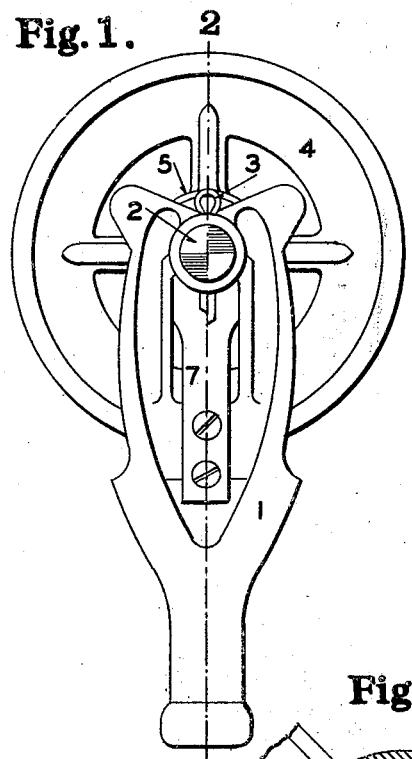
Figure 2:
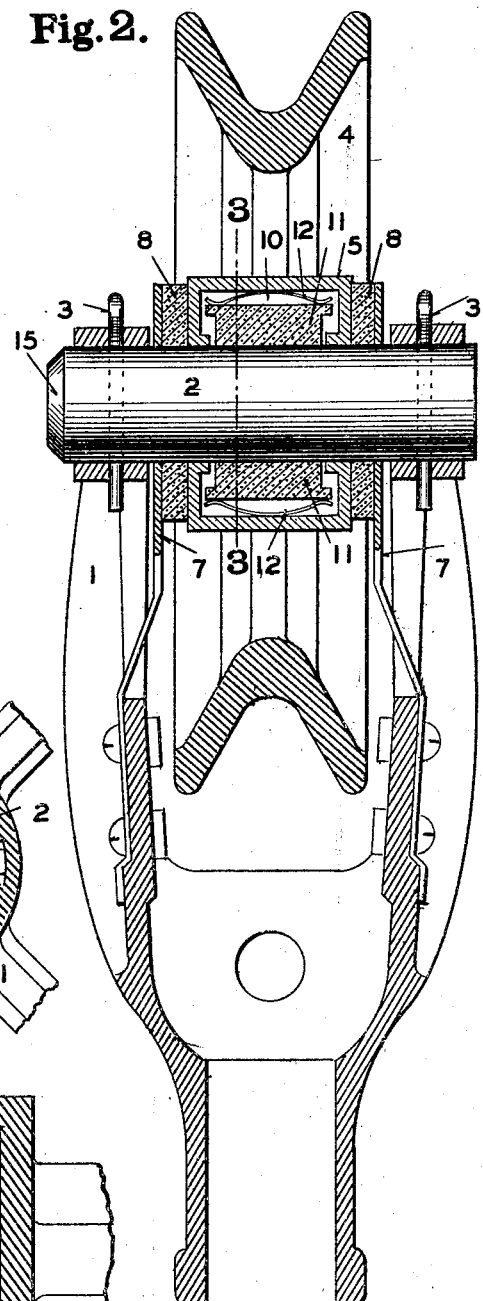
Figure 3:
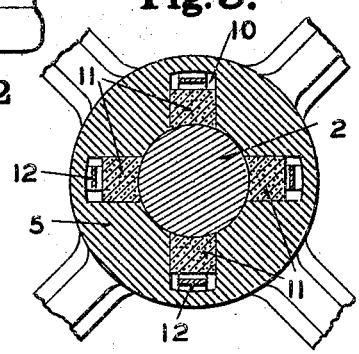
Figure 4:
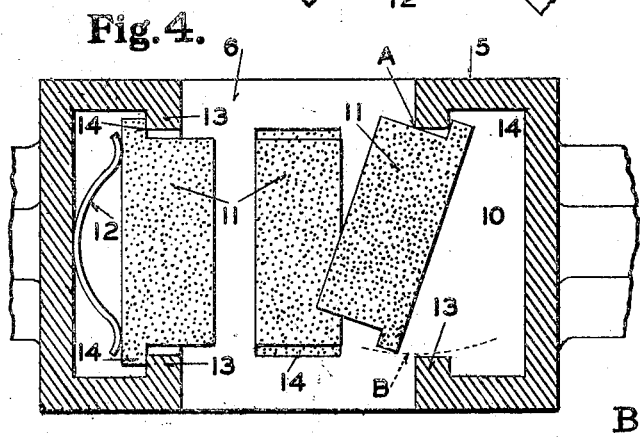

In the accompanying drawings, which illustrate one form of trolley structure made in accordance with my invention, Figure 1 is a side elevation; Figure 2 is an enlarged section taken on the line 2—2 of Figure 1; Figure 3 is a fragmentary section taken on the line 3—3 of Figure 2; and Figure 4 shows the method of inserting the lubricating blocks into the recesses in the wheel hub.

The trolley harp 1 may be of any usual form. Carried by the harp is a non-rotary axle 2 secured in position by any suitable means, such as the cotter pins 3. Mounted on the axle is a trolley wheel 4, the hub 5 of which is provided with a bore 6 having a running fit on the axle and the thickness of which is considerably less than the distance between the arms of the harp so that each end of the hub is spaced from the adjacent arm. Trolleys of this type are provided with spring conducting arms 7 bearing directly on the ends of the hub or against metallic washers positioned between the hub and the springs. In place of such metallic washers I use washers 8 formed of some material which will serve both as a lubricant and as a conductor of electricity. For this purpose I find graphite a satisfactory material. The use of these lubricating washers not only reduces friction against the ends of the hub but assists, in conjunction with the internal lubricating blocks, hereinafter described, in the lubrication of the bearing between the hub and the axle.

Formed in the hub are pockets 10, preferably four in number. In each of the pockets is placed a lubricating block 11, preferably of graphite, which is forced against the axle by a leaf spring 12. These blocks extend across the major portion of the width of the hub leaving only short spaces at the ends unlubricated by direct contact with the blocks. These short end spaces will, however, be effectively lubricated by graphite working outwardly around the axle from the blocks 11 and inwardly from the washers 8. Each of the pockets is provided at each end with a lip 13 and each of the blocks 11 with a pair of projecting shoulders 14, the over-all length of the block, including the shoulders, is somewhat greater than the distance between the lips 13 so that the shoulders and lips overlap when the blocks are in position. To insert a block it is tilted and one end placed against a corner A of one of the lips, as shown at the right hand side of Figure 4. With the corner A as a pivot the other end of the block is now swung into the pocket along the dotted line B. It will be understood that one of the leaf springs 12 should be placed in the pocket either before starting to insert the block, or slipped into the pocket behind the block when it is about in the position shown, as is found most convenient. When both shoulders are well within the pocket the block is moved longitudinally to center it and the spring allowed to force the shoulders against the lips, as shown at the left hand side of Figure 4. In this position the block is firmly held in place so that the wheel may be shipped in assembled form. The method of holding the block also aids in positioning the wheel on the axle, an operation which would otherwise involve considerable difficulty. To aid in the positioning of the wheel on the axle, one or both ends of the latter are preferably beveled or chamfered, as shown at 15 (Figure 2).

Having fully described my invention, what I claim as new and desire to secure by Letters Patent of the United States is:

1. In a device of the class described, the combination with a trolley harp, of a non-rotary axle carried thereby, a pair of conducting springs on said harp and biased toward the hub of the wheel, a block of lubricating material carried in said hub and extending to points adjacent the ends thereof, and washers of lubricating and conducting material interposed between said springs and the hub, said washers cooperating with said block to lubricate the wheel bearing throughout its length.

2. A trolley wheel having in its hub a pocket opening into the axle bore thereof, a block of lubricating material in said pocket, a spring for pressing said block against an axle, and means for retaining the block in the pocket against the tension of said spring when the bore is unoccupied by the axle.

3. A trolley wheel having in its hub a pocket opening into the axle bore thereof, said pocket being provided with a pair of opposing lips, a block of lubricating material in said pocket, said block being provided with a pair of shoulders, the over-all dimension of said block including said shoulders being greater than the distance between said lips, and a spring in said pocket holding said shoulders against said lips when the bore is unoccupied by the axle.

4. A trolley wheel having in its hub a pocket opening only into the axle bore thereof, said pocket being provided adjacent the bore with a pair of opposing lips, a block of lubricating material in the pocket, said block being provided adjacent its rear face with a pair of shoulders, the over-all dimension of said block including said shoulders being greater than the distance between said lips, said blocks being insertable between the lips by tilting, and a spring for holding said shoulders against said lips when the bore is unoccupied by said axle.

In testimony whereof, I hereunto affix my signature, this 24th day of June, 1931.

ALBERT VIGNE.